US006968286B1

(12) United States Patent
Watkins

(10) Patent No.: US 6,968,286 B1
(45) Date of Patent: Nov. 22, 2005

(54) FUNCTIONAL-PATTERN MANAGEMENT SYSTEM FOR DEVICE VERIFICATION

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 516 days.

(21) Appl. No.: 09/363,311

(22) Filed: Jul. 28, 1999

(51) Int. Cl.[7] .................. G06M 19/00; G06F 19/00
(52) U.S. Cl. .................................................. 702/124
(58) Field of Search .................. 702/70, 110, 117, 702/118, 119, 120, 124, 126, 190; 714/742; 716/5; 707/101; 709/231; 395/708; 324/537, 324/511, 527

(56) References Cited

U.S. PATENT DOCUMENTS

| | | | | |
|---|---|---|---|---|
| 5,121,335 A | * | 6/1992 | Barouch et al. ............... 716/19 |
| 5,291,495 A | * | 3/1994 | Udell, Jr. ..................... 714/726 |
| 5,684,808 A | * | 11/1997 | Valind ......................... 714/748 |
| 5,737,495 A | * | 4/1998 | Adams et al. ............ 707/104.1 |
| 5,740,064 A | * | 4/1998 | Witte et al. .................... 702/70 |
| 5,862,149 A | * | 1/1999 | Carpenter et al. .......... 714/726 |
| 5,949,691 A | * | 9/1999 | Kurosaka et al. .............. 716/5 |
| 6,141,630 A | * | 10/2000 | McNamara et al. .......... 703/14 |
| 6,256,770 B1 | * | 7/2001 | Pierce et al. ................... 716/18 |
| 6,260,185 B1 | * | 7/2001 | Sasaki et al. .................. 716/18 |
| 6,327,686 B1 | * | 12/2001 | Grundmann et al. ........ 714/738 |
| 6,356,858 B1 | * | 3/2002 | Malka et al. ................ 702/186 |

* cited by examiner

*Primary Examiner*—Marc S. Hoff
*Assistant Examiner*—Mary Catherine Baran
(74) *Attorney, Agent, or Firm*—Conley Rose, P.C.

(57) ABSTRACT

A profile-based system is described for verifying the functionality of a device design. In one embodiment, the system includes a profile generation module, a coverage measurement module, and a pattern generation module. The profile generation module operates from a rule set that represents the design specification and any applicable standards, and a profile mode that specifies "interesting" aspects of test patterns for device design verification. The profile generation module determines an ordered set of variable values that specify a test pattern, and produces a profile that intelligibly describes the interesting aspects of the test pattern. The coverage measurement module analyzes the profile to determine coverage, and the analysis results may be operated on by the profile generation module to determine a profile for an improved test pattern. The pattern generation module converts the profile into a test pattern having the interesting aspects specified in the profile.

20 Claims, 3 Drawing Sheets

FUNCTIONAL-PATTERN MANAGEMENT SYSTEM FOR DEVICE VERIFICATION

BACKGROUND OF THE INVENTION

1. Field of the Invention

This invention relates to the field of device verification, and in particular, to a system for profiling, checking, optimizing and generating test patterns for verifying functionality of a device.

2. Description of the Related Art

As technology continues to improve, digital electronic products become increasingly sophisticated and present a bigger verification challenge to product designers. A huge expense is incurred in setting up the manufacturing process for constructing a particular product, so designers need to be sure their product design operates correctly before finally implementing it in silicon. Due to the sheer number of components that make up a typical product, verification of the functionality of the overall product is no small task.

Since electronic devices are designed to produce a deterministic set of output signals in response to a given set of input signals, verification at its most fundamental level consists of providing the given set of input signals to the device and comparing the resulting set of output signals to a set of expected output signals. If the device is operating correctly, no mismatch is found.

Complete verification can theoretically be achieved by applying all valid sets of input signals to the device and determining that the output signal sets match the expected signal sets. This is almost always impractical due to the number of valid sets of input signals, particularly in the case of devices with a large number of internal states, e.g. microprocessors. Consequently, the system designer seeks a set of input signals of a tolerable size which can provide a "high-enough" level of verification. How are verification levels measured? What constitutes a "high-enough" level of verification? These questions are still the subject of much debate.

Various traditional methods of obtaining a set of input signals for verification exist. In one method, the device designers arbitrarily generate input signal sets that they believe will exercise the various device components. This method serves well for verifying high-level, obvious operations of the device. In another method, a computer generates a large set of random input signals. This method is undirected and results in inefficient use of computer resources. These two methods are often combined to form a hybrid method, in which the designer-generated input signal sets are augmented by a set of random input signals.

The amount of confidence placed in a device's successful handling of a set of input signals depends on the estimated verification level, i.e. the percentage of complete verification provided by operating on the set of input signals. Verification levels are commonly stated in terms of coverage of some design aspect of the device. It should be noted that while complete verification implies complete coverage of any given device design aspect, the converse is not necessarily true. For example, one coverage measurement is determined from a hardware description language (HDL) code listing used to design the device. This coverage measurement states the percent coverage in terms of the percentage of HDL code lines from the entire code listing that are executed by a simulator in response to the set of input signals. However, since a single HDL code line can often represent a circuit module of moderate complexity, a single execution of that code line falls well short of thoroughly verifying that code module.

Another coverage measurement is determined by monitoring each electrical node in the device and counting the number of nodes that are toggled at least once during application of the set of input signals. The percent coverage is then stated in terms of the percentage of toggled nodes. Again, this falls well short of thoroughly verifying the device since most of the combinations of nodes states go untested. A simple example of a fault that could be missed is a short between adjacent nodes that would prevent proper device operation when the device is expected to place the nodes in different states, but would go undetected by tests that toggle the nodes in synchronization.

Another coverage measurement is determined by simulating faults and counting the percentage of faults that are detected by application of the input signal set. While effective, this measurement method is statistical in nature and requires a substantial amount of computer resources.

Each of these methods attempts to measure the verification level from a hardware perspective; a daunting task due to the sheer number of combinations of node states that can exist in even a relatively simple device. The designer is often left with a choice between a low verification level and an inconveniently large set of input signals.

Verification terminology that is used herein is as follows: The group of input signals applied to a device at a given time instant is an input vector; a sequence of input vectors over consecutive time instants forms an input pattern. Similarly, output signals are referred to in terms of output vector and output pattern. An input pattern and its associated expected output pattern together form a test pattern, although it should be understood that the test pattern can be specified by the input pattern and a method for determining the desired output pattern (e.g. a device simulator). The procedure of running a test pattern includes applying an input pattern to the device and comparing the output pattern from the device with the expected output pattern. Depending on the situation, the device may need to be placed in a specified initial state before the input pattern is applied. Where the test pattern is designed to verify one or more functional aspects of the device, the test pattern is a functional test pattern or sometimes just a functional pattern. A distinction might be drawn between a functional test pattern and a manufacturing test pattern, in that the manufacturing test pattern is designed to verify that the manufacturing process is creating devices with a low defect rate. Nevertheless, some commonality exists, and it is noted that a functional test pattern could serve as a manufacturing test pattern, and vice versa.

Test patterns can comprise an enormous amount of data, in fact the running of some test patterns can last for days. Construction and handling of these test patterns can be difficult and unwieldy. A system infrastructure that provides for uniform handling of test patterns and simplifies the verification process would provide dramatic savings of time and effort, and advantageously reduce the overall cost of device design.

SUMMARY OF THE INVENTION

Accordingly, there is provided herein a system and method for verifying the functionality of a device design. In one embodiment, the system includes a profile generation module, a coverage measurement module, and a pattern generation module. The profile generation module operates from a rule set that represents the design specification and any applicable standards, and a profile mode that specifies "interesting" aspects of test patterns for device design verification. The interesting aspects are determined by the user and may be somewhat subjective, although it is preferable that the aspects relate to the coverage provided by the test pattern. Given the rule set and the profile mode, the profile generation module determines an ordered set of variable values that at least partially specify a test pattern, and produces a profile that intelligibly describes the interesting aspects of the test pattern. Tools such as the coverage measurement module and the pattern generation module may then operate on the profile of the test pattern. The coverage measurement module analyzes the profile to determine coverage, and the analysis results may be operated on by the profile generation module to determine a profile for an improved test pattern. The coverage measurement module may preferably employ a design-vector grading (DVG) metric or a variation thereof. The pattern generation module converts the profile into a test pattern having the interesting aspects specified in the profile. The system may further include a pattern profiling module for converting existing test patterns into profiles, and a pattern checking module for verifying that profile-represented patterns satisfy particular rules. This system efficiently produces test patterns that are better understood by the user and that enable better coverage due to the use of the human-intelligible profile.

BRIEF DESCRIPTION OF THE DRAWINGS

Other objects and advantages of the invention will become apparent upon reading the following detailed description and upon reference to the accompanying drawings in which.

Figure 1:
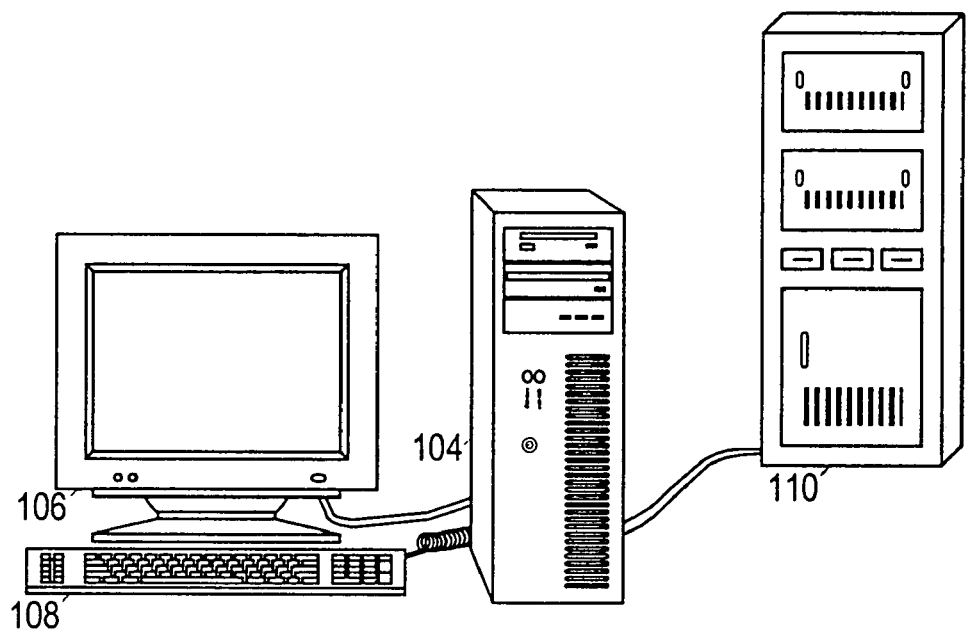
FIG. 1 shows a system for device verification.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a system for device verification. The system comprises a workstation 104 having a monitor 106 and an input device 108. Workstation 104 is coupled to a device emulator 110 which may be configured to simulate the operation of millions of logic gates and registers. Device emulator 110 may be further configured to run test patterns on an emulated device in response to instructions from workstation 104. Alternatively, device emulator 110 may be replaced by a device tester configured to run test patterns on an actual device. Benefits of emulation include access to internal registers that may not be "visible" from outside an actual device. However, emulation tends to require more time and computer power than testing on a prototype. This difficulty is sometimes addressed by simulating only portions of the device, and if the portion is small enough, the simulations may be carried out by workstation 104.

Figure 2:
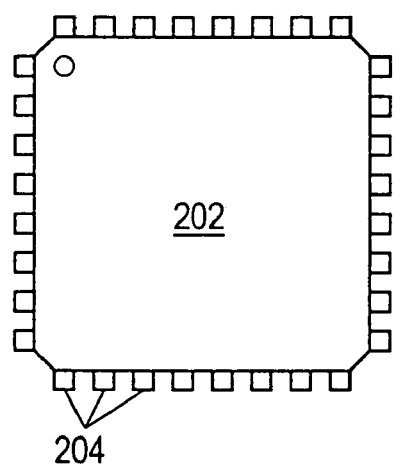
FIG. 2 shows an example of a device.

FIG. 2 shows an exemplary device 202 having pins 204. Pins 204 may convey input signals, output signals, and/or clock signals, and a single pin may serve multiple functions through time-division multiplexing or logical reconfiguration (e.g. I/O bus pins). Functional test patterns are conventionally provided in binary fashion with 1 bit representing the desired state of each input pin and the expected state of each output pin at each time interval. This representation is not readily conducive to human understanding, management, or manipulation of the functional test patterns.

Workstation 104 preferably implements a functional pattern management system that provides one or more of the following advantages: (1) more efficient verification effort before device implementation in silicon, (2) a uniform framework for generating, checking, and measuring pattern coverage, (3) automated pattern generation for verification of functions not already covered, (4) optimization of patterns to increase effectiveness through eliminating redundancy, providing of increased testing ranges, or contributing to coverage, (5) input partitioning, and (6) coverage measurement in terms of design specification and any applicable standards. One such system is shown in FIG. 3.

Figure 3:
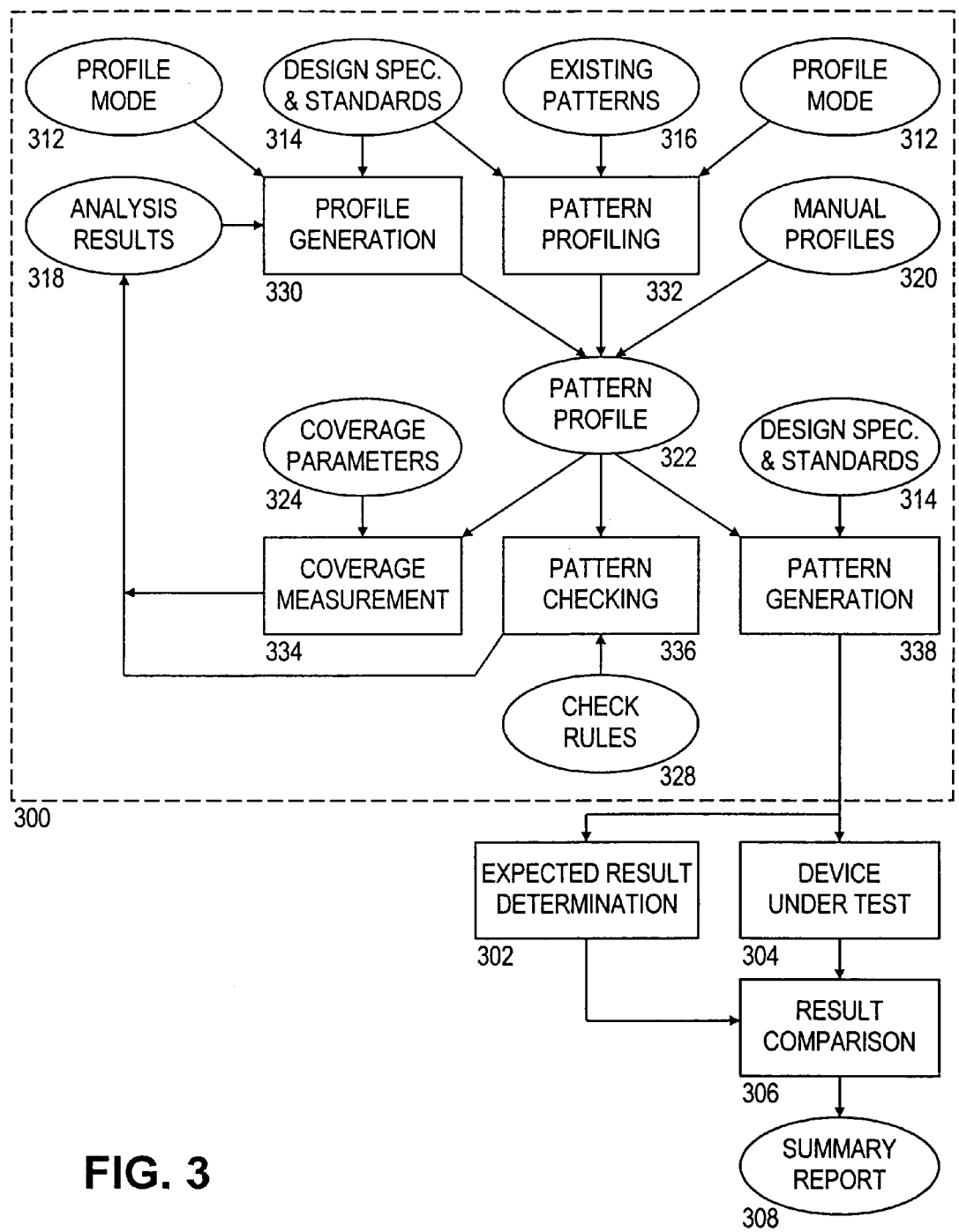
FIG. 3 shows a verification system that employs a profile-based framework.

FIG. 3 shows a block diagram of a system 300 for managing functional patterns, an expected result determination module 302, a device under test 304, a result comparison module 306, and a summary report 308. The system 300 operates on a profile mode 312, a design specification and/or standards 314, existing functional patterns 316, coverage analysis results 318, manual profiles 320, pattern profiles 322, coverage parameters 324, and check rules 328, and comprises a profile generation module 330, a pattern profiling module 332, a coverage measurement module 334, a pattern checking module 336, and a pattern generation module 338. System 300 is based on the concept of a profile, which is an intelligible, compact representation of a data stream. A large test pattern can be completely represented by a concise profile using techniques described below, and this results in an enormous savings of effort in handling test patterns.

A profile may be obtained by filtering the data stream (i.e. retaining only those portions of interest) and de-compiling the retained portions (i.e. converting the field values to human-intelligible form). A reason for doing this is that data streams, which are typically very large and unintelligible, may be more easily manipulated by manipulating their profiles. The use of profiles provides a unified framework that is applicable to many different structured data streams. Functional test patterns for verification are amenable to profiling.

Figure 4:
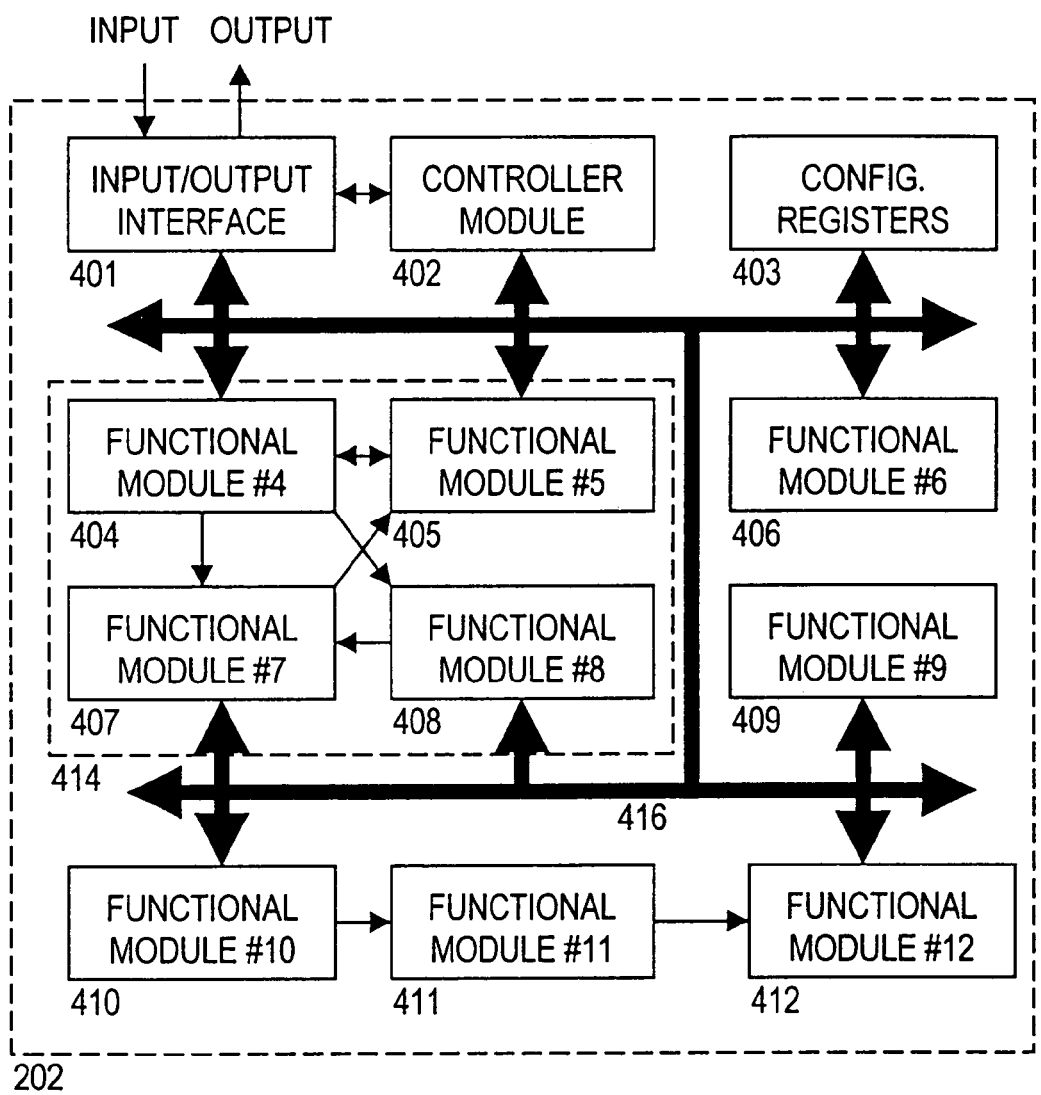
FIG. 4 shows an exemplary functional block diagram of a device.

A profile captures the essence of a data stream with respect to the purpose of the handler of the data stream. When the need exists for verification of device functionality, a test pattern may be best represented in terms of the functions it verifies. Turning momentarily to FIG. 4, exemplary device 202 is shown in terms of a functional block diagram that includes functional modules 401–412, a composite functional module 414, and an on-chip bus 416. Functional module 401 may be an input/output interface, functional module 402 may be a microcontroller, functional module 403 may be a set of configuration registers, and so on. These high-level functional modules may be subdivided into functional sub-modules, and these may be further divided again and again until the component level is reached. The components at the final level may be gates, registers, or other pre-designed and verified components.

It is noted that exhaustive verification of every device component is undesirable and normally infeasible. It is further noted that not all functions are equally important, and that more benefit is gained from verification of important functions than unimportant functions. For example, verifying the functional sub-modules interfacing two large functional modules is more beneficial than verifying the operation of a pre-verified component. Accordingly, test patterns can be designed to preferentially verify the more important components at the expense of the less important components.

Intel and Zycad have proposed a metric to assess when the verification level is adequate. Design vector grading (DVG) partitions the hardware nodes in a device into three categories: high level function critical nodes, low level function critical nodes, and non-critical nodes. High level function critical nodes are typically interconnections between high level functions, and 100% coverage of these nodes is desired. Low level function critical nodes are typically interconnections between low level functions, and 80% coverage of these nodes is desired. Non-critical nodes are typically interconnections between simple gates, or connections where coverage is implied by coverage of the other two categories. The coverage of the third category is not measured. A pattern is determined to provide coverage over a given node if the pattern can detect simulated faults ("stuck-at-0" and "stuck-at-1") at that node. This approach substantially reduces the number of nodes that need to be simulated.

It is noted here that DVG can be advantageously extended to increase or decrease the number of categories, and to allow flexible requirements for category membership. Assuming all the hardware nodes are initially grouped in an "uncategorized" pool, the node classification could be done by executing an ordered set of rules in which each rule operates on the nodes remaining in the uncategorized pool. In one example, the following set of rules could be used:

1. all nodes having a hierarchy level of 1–3 are members of category I
2. all bus nodes are members of category I
3. all clock nodes are members of category I
4. all i/o nodes of pre-tested modules with >100 gates are members of category II
5. all remaining nodes are members of category III The required coverage levels for each of the categories may be adjusted as well.

One form of a profile could be based on the node categories. In one example, the profile includes a list of category I nodes and category II that are covered by the pattern. The pattern itself may be stored in a compressed form and in a location which are identified by the profile. Associated with the profile is a profile mode that is used to construct the profile. In this example, the profile mode may include the set of rules used to categorize the nodes.

Another form of a profile could be based on functional module test patterns. In one example, test patterns for the overall device are reduced into the test patterns they induce for a single functional module, i.e. the profile may be the input/output patterns for i/o signals of a single functional module or sub-module of the device.

Yet another form of a profile could be based on important subsets of the test patterns. In one example, the input signals to a microprocessor include instructions, data, interrupt signals, clock signals, DMA signals, etc. The profile may be an ASCII list of the instructions and data provided to the microprocessor.

In many devices, the patterns may include data streams which are subject to syntax restrictions. In profiling the patterns for these devices, the functional pattern management system may draw upon the profiling tools and techniques disclosed in U.S. patent application Ser. No. 08/838,798 entitled "A method for managing data streams for comprehensive verification of circuits, devices, and systems" by inventors Daniel Watkins, Shat Mar, and Sobha Varma, and filed Apr. 10, 1997. This application is hereby incorporated by reference. In particular, the data streams may have various syntax fields that need to be preferentially covered during the verification process, and these syntax fields are represented in the profile and the unimportant fields ignored by the profile. In some cases, the syntax fields may contain instructions, in which case the profile may be specified in a form resembling a program listing.

In each of these examples, the profile serves as a concise, human-intelligible representation of a functional test pattern that nevertheless captures the interesting essence of the functional test pattern. As the verification approach changes, the profile is adjusted by changing the profile mode, and the functional test patterns are efficiently handled by manipulating the profiles rather than the patterns whenever possible.

Returning to FIG. 3, profile generation module 330 generates a test pattern profile 322 from a design specification 314, a profile mode 312, and analysis results 318. The design specification and standards 314 provide a set of rules specifying the desired operation of the device. Since comprehensive verification of all input patterns allowable under the rules is typically infeasible, profile generation module 330 includes a generator that determines instances of input patterns from a selected subset of all input patterns. The "selected" subset may be random patterns, exhaustive combinations of certain input fields and/or input pins, or patterns designed to toggle specific nodes in the device. Each of these instances may be specified as an ordered set of values, often referred to as a permutation. The generator is preferably configured to specify the permutation in the form of a profile, according to the profile mode 312. Alternatively, the permutation is converted into a profile. The profile mode 312 specifies what interesting information is to be captured in the profile. This may take the form of indicating which functional modules or signal nodes that coverage is sought for.

The permutation generator of profile generator 330 may simply take an ordered set of variables and exhaustively "step through" values for each variable to generate an exhaustive list of permutations. Alternatively, the permutation generator may examine coverage results 318 from previous permutations, and selectively generate permutations designed to exercise nodes not yet covered.

Pattern profiling module 332 converts existing test patterns 316 into pattern profiles 322 using the design specification 314 and a profile mode 312. The design specification 314 provides the understanding necessary to understand the patterns 316 and their effect on the device, and the profile mode 312 provides the desired form for profiling the patterns 316.

Pattern profiles 322 are not necessarily generated by profile generation module 330 or pattern profiling module 332. Indeed, pattern profiles 322 may be manually entered or manually modified profiles 320. This is only applicable for profile modes that allow the test pattern to be generated from the profile. One example of this instance is a profile that includes a test pattern for a function module. From this profile, a test pattern for the device can be constructed to deliver the test pattern to the function module.

Coverage measurement module 334 processes a pattern profile 322 using a set of coverage parameters 324 to produce a set of analysis results 318. Coverage measurement module 334 preferably determines a coverage measurement according to the extended DVG method described above, although other coverage measurements may be used. The coverage parameters 324 may specify the criteria being used to determine coverage, including categorization rules and desired levels of coverage when the extended DVG method is used. The measurement results 318 may be processed by the profile generation module 330 to determine profiles of new test patterns or modified test patterns designed to improve the measured coverage.

Pattern checking module 336 operates on pattern profile 322 using a set of check rules 328 to produce a set of analysis results 318. Pattern checking module 336 verifies compliance of patterns represented by the profile 322 with the provided set of check rules 328. The check rules 328 may be set as desired by the user, and might typically be optional portions of the design standards and specification 314. The results 318 may be processed by the profile generation module 330 to determine profiles of new or modified test patterns designed to ensure compliance with the check rules.

Pattern generation module 338 operates on a pattern profile 322 using the design specification and standards 314 to reproduce a test pattern represented by the profile 322. Since the profile 322 captures the "interesting" information about the test pattern, the module 338 takes this information, converts it to a test pattern, and fills in the "uninteresting" context, i.e. those signals which are relatively static or have an established pattern. The resulting test pattern can be applied to an actual or simulated device-under-test 304 and a module that implements a known standard for expected result determination 302. The output patterns from determination module 302 and device 304 are compared by comparator module 306 which provides the comparison result in the form of a summary report 308.

The functional pattern management system describe in FIG. 3 provides a uniform framework for generating, checking, and measuring test pattern coverage that makes verification more efficient. The uniform framework advantageously standardizes the tools used for verification of different devices, thereby reducing the overall cost of developing new devices. The process is more efficient since the verification engineers can focus on the "interesting" aspects of patterns, i.e. the portions of test patterns which accomplish the most needed verification. Capturing this information in a profile eliminates the tedium of sorting through raw test pattern information and deciding (guessing) whether the necessary level of coverage is being provided. Further, this level of control allows for patterns to be modified and optimized for better coverage. The framework includes the ability to automatically generate or modify patterns to provide coverage for what hasn't yet been covered, and allows the coverage measurements to be tied directly to the design specification and standards. The framework advantageously supports the concept of input partitioning, allowing the verification problem to be broken down into manageable chunks and thereby greatly reducing the "verification space" (number of input permutations) that need to be explored.

Numerous variations and modifications will become apparent to those skilled in the art once the above disclosure is fully appreciated. It is intended that the following claims be interpreted to embrace all such variations and modifications.

What is claimed is:

1. A system for device verification, wherein the system comprises
 a profile generation module configured to provide a pattern profile that represents a sequence of input signal vectors with an associated sequence of output signal vectors (hereafter a "test pattern"), wherein the pattern profile includes a human-intelligible description of aspects of the test pattern, wherein the aspects are specified by a profile mode;
 a coverage measurement module configured to process the pattern profile to produce analysis results indicative of coverage provided by the test pattern, wherein the profile generation module is further configured to process the analysis results to provide an improved pattern profile; and
 a pattern generation module configured to receive the improved pattern profile and to convert the improved pattern profile into a test pattern for verifying device performance.

2. The system of claim 1, wherein the coverage measurement module is configured to determine coverage of the test pattern by ascertaining if node faults are detectable, wherein node faults are detectable if running the test pattern on a device would indicate a failure.

3. The system of claim 2, wherein the coverage measurement module ascertains if node faults are detectable for those nodes in a first category, and wherein the coverage measurement module ignores those nodes in a second category.

4. The system of claim 1, further comprising:
 a test pattern profiling module configured to convert an existing test pattern into a pattern profile as specified by a profile mode.

5. The system of claim 1, further comprising:
 a pattern checking module configured to process the pattern profile to produce analysis results indicative of whether the test pattern complies with a specified rule.

6. The system of claim 1, wherein the pattern generation module is coupled to run the test pattern on a device-under-test that implements at least a portion of a device design.

7. The system of claim 6, wherein the device design has a set of interesting input signals and a set of customary input signals, wherein the profile includes a human-intelligible representation of the set of interesting input signals, and wherein the profile does not include any representation of the set of customary input signals.

8. The system of claim 6, wherein the device design includes functional modules each having module input signals and module output signals.

9. The system of claim 8, wherein the profile includes a human-intelligible representation of a test pattern for one of the functional modules.

10. The system of claim 1, wherein the profile generation module is configurable to generate sequential permutations of values to specify pattern profiles.

11. A system for verifying device designs that include functional modules, wherein the system comprises:
 a profile generation means for providing a pattern profile that represents a sequence of input signal vectors with an associated sequence of output signal vectors (hereafter a "test pattern"), wherein the pattern profile includes an intelligible description of aspects of the test pattern, wherein the aspects are specified by a profile mode;

a coverage measurement means for analyzing the pattern profile to produce analysis results indicative of coverage provided by the test pattern, wherein the profile generation means is further configured to process the analysis results to provide an improved pattern profile; and a pattern generation means for converting the improved pattern profile into a test pattern.

12. The system of claim 11, wherein the coverage measurement means is configured to determine coverage of the test pattern by ascertaining if node faults are detectable.

13. The system of claim 11, further comprising:
a test pattern profiling means for converting an existing test pattern into a pattern profile.

14. The system of claim 11, wherein the pattern generation means is coupled to run the test pattern on a device simulation means that implements at least a portion of a device design.

15. The system of claim 14, wherein the device design has a first set of input signals and a second distinct set of input signals, wherein the profile includes an intelligible representation of the first set of input signals, and wherein the profile does not include any representation of the second set of input signals.

16. The system of claim 14, wherein the device design includes functional modules each having module input signals and module output signals, and wherein the profile includes an intelligible representation of a test pattern for one of the functional modules.

17. A method for verifying a device design using a sequence of input signal vectors with an associated sequence of output signal vectors (hereafter a "test pattern"), wherein the method comprises:

analyzing a test pattern profile to determine coverage of a test pattern;

generating a second profile for an improved test pattern that provides better coverage;

converting the second profile into the improved test pattern; and running the improved test pattern on a simulated device.

18. The method of claim 17, wherein the test pattern profile includes an intelligible representation of aspects of the test pattern, and wherein the aspects are specified by a profile mode.

19. The method of claim 18, wherein one aspect specified by the profile mode is a subset of input signals that represent instructions.

20. The method of claim 18, wherein one aspect specified by the profile mode is a set of input signals for a functional sub-module of the device design.

* * * * *